United States Patent [19]

Breuer

[11] 3,859,274
[45] Jan. 7, 1975

[54] ACYLTHIOMETHYL ESTERS OF PENICILLINS

[75] Inventor: Hermann Breuer, Regensburg, Germany

[73] Assignee: E. R. Squibb & Sons, Inc., Princeton, N.J.

[22] Filed: July 13, 1972

[21] Appl. No.: 271,478

[52] U.S. Cl............................. 260/239.1, 424/271
[51] Int. Cl............................................. C07d 99/16
[58] Field of Search................................. 260/239.1

[56] References Cited
UNITED STATES PATENTS

| | | | |
|---|---|---|---|
| 3,632,810 | 1/1972 | Bickel et al. | 260/243 C |
| 3,697,507 | 10/1972 | Frederiksen et al. | 260/239.1 |
| 3,767,645 | 10/1973 | Treuner et al. | 260/239.1 |

Primary Examiner—Nicholas S. Rizzo
Attorney, Agent, or Firm—Lawrence S. Levinson; Merle J. Smith

[57] ABSTRACT

New acylthiomethyl esters of penicillins have the formula

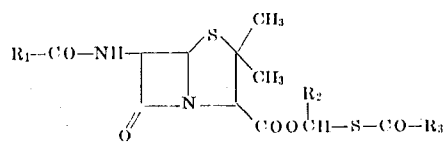

wherein $R_1$ is lower alkyl, cycloalkylmethyl, cycloalkenylmethyl, cycloalkadienylmethyl, aryloxymethyl, aralkyl, certain heterocyclic groups; and certain substituted members of such groups; $R_2$ is hydrogen, lower alkyl, phenyl or phenyl-lower alkyl and $R_3$ is lower alkyl, lower alkenyl, aryl or aralkyl. They are useful as antibacterial agents.

9 Claims, No Drawings

ACYLTHIOMETHYL ESTERS OF PENICILLINS

BACKGROUND OF THE INVENTION

It is known that many penicillins are either not absorbed or not readily absorbed in the gastrointestinal tract, benzylpenicillin, for example. Therefore such compounds are usually administered parenterally in order to achieve high serum concentrations. It is therefore advantageous to have derivatives of penicillins a high percentage of which are absorbed on oral administration and produce their antibiotic effect.

The new acylthiomethyl penicillin esters of this invention are more readily absorbed from the gastrointestinal tract and then are readily hydrolyzed to the free penicillin thereby providing a high concentration of antibiotically active substance. These esters also show good activity against fungi like *Candida albicans*.

SUMMMARY OF THE INVENTION

This invention relates to new acylthiomethyl esters of penicillins having the formula (I)
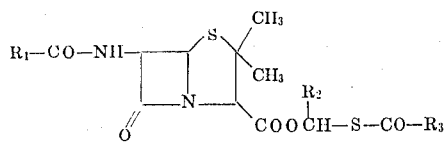

$R_1$ is lower alkyl, cycloalkylmethyl, like cyclopropylmethyl, cyclobutylmethyl, cyclopentylmethyl or cyclohexylmethyl, cycloalkenylmethyl, monounsaturated cycloaliphatics like the foregoing cycloalkylmethyl groups, cycloalkadienylmethyl like cyclopentadienylmethyl or cyclohexadienylmethyl, aryloxymethyl like phenoxymethyl, aralkyl, e.g., phenyl-lower alkyl or the same groups with simple substituents on the phenyl and certain heterocyclic groups like furylmethyl, thienylmethyl, oxazolymethyl, thiazolylmethyl, isoxazolylmethyl and such groups simply substituted. Members of the foregoing groups substituted on the α-carbon atom with an amino, hydroxy, carboxy, ureido, lower alkanoylureido, sulfonylureido, sulfonyl or sulfonylamido group are also included. $R_2$ is hydrogen, lower alkyl, phenyl or phenyl-lower alkyl. $R_3$ represents lower alkyl, lower alkenyl, aryl or aralkyl groups such as those described above.

When $R_1$ is a basic substituent the products form acid addition salts which are also within the scope of the invention.

The preferred members of the group are those wherein $R_1$ is benzyl, phenoxymethyl or α-substituted benzyl, especially wherein the α-substituent is amino, hydroxy, carboxy or ureido, or thienylmethyl, $R_2$ is hydrogen or lower alkyl and $R_3$ is lower alkyl, especially methyl or ethyl, t-butyl, or phenyl.

DETAILED DESCRIPTION OF THE INVENTION

The various groups represented by the symbols have the meanings defined below and these definitions are retained throughout this specification.

The lower alkyl groups are straight or branched chain hydrocarbon radicals having one to eight carbons in the chain, for example, methyl, ethyl, propyl, isopropyl, butyl, isobutyl, s-butyl, t-butyl, amyl or the like. The lower alkenyl groups are monounsaturated hydrocarbon radicals like those just described.

The aryl groups are monocyclic carbocyclic aryl groups including simply substituted members. By way of illustration, this includes the phenyl ring and simply substituted phenyl containing one to three substituents (preferably only one) such as the halogens (chlorine and bromine being preferred), lower alkyl groups such as those defined above, lower alkoxy groups, (i.e., lower alkyl groups of the type defined above attached to an oxygen), hydroxy, amino, carboxy and the like. In the case of the last two named substituents there is preferably only one, especially in the para position of the phenyl.

The aralkyl groups include a monocyclic carbocyclic aryl group attached to a lower alkyl group, both as defined above, benzyl being preferred. The cyclo-lower alkyl groups are the alicyclics of three to six carbon atoms, e.g., cyclopropyl, cyclobutyl, cyclopentyl and cyclohexyl; cyclopentyl and cyclohexyl are preferred. The cyclo-lower alkenyl groups are the 4 to 6 carbons monounsaturated cyclic groups including cyclobutene, cyclopentene and cyclohexene. The cyclo-lower alkadiene groups are similar cyclic groups which have two double bonds, particularly cyclohexadienyl and especially 1,4-cyclohexadienyl. All of these are attached to a bridging methylene group.

The heterocyclic groups represented by $R_1$ are the heterocyclic radicals thienylmethyl, furylmethyl, oxazolylmethyl, isoxazolylmethyl and thiazolylmethyl, as well as these heterocyclics with the substituents halo, lower alkyl (particularly methyl and ethyl), lower alkoxy (particularly methoxy and ethoxy) or phenyl.

In addition, the $R_1$ groups, especially those with a cyclic substituent, may be substituted on the α-carbon atom. These include hydroxy, amino, carboxy, ureido, lower alkanoylureido, sulfonylureido, sulfonyl or sulfonylamido.

The compounds described above are essentially neutral, when $R_1$, however, is a basic group α-aminobenzyl for example, acid addition salts of the conventional type are formed, e.g., hydrohalides like the hydrochloride, other inorganic acid salts like the sulfate, phosphate, organic salts like the citrate, benzenesulfonate, toluenesulfonate, etc.

The new compounds of this invention may be synthesized by several methods.

According to one method (which is preferred) a salt of a penicillin of the formula (II)
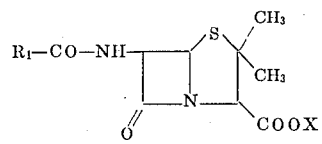

is made to react with a compound of the formula (III)
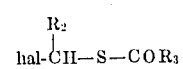

$R_1$, $R_2$ and $R_3$ have the same meaning as above, X is a cation, e.g., a metal cation such as the alkali metal cations sodium and potassium, or the cation of a nitrogen base such as the ammonium ion, trialkylammonium ions, etc., and hal is a halogen, especially chlorine or bromine.

This reaction is effected at a temperature of about 0° to 50°C., preferably in a suitable inert organic solvent such as dimethylformamide, dimethylacetamide, acetone, dioxane or the like.

The compounds of formula III are produced by known methods [H. Bohme et al., Liebigs Annalen 623, 92–102 (1959)], for example, as shown in the following flow scheme, by reacting a thioacid of formula IV with an aldehyde of formula V whereby the corresponding hydroxymethyl ester of the thioacid VI is formed, this is halogenated, for example by treatment with a phosphorus trihalide, like phosphorus tribromide, to obtain the corresponding halomethyl ester (III):

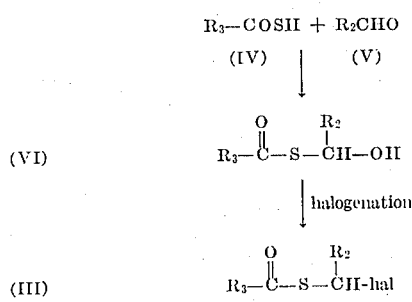

The synthesis of the new acylthiomethyl esters of penicillins of formula I may also be effected from α-haloalkyl esters of 6-aminopenicillanic acid derivatives of the formula (VII)
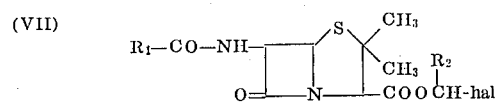

The compound of formula VII is reacted with a salt, for example, an alkali metal salt, of a compound of formula IV above in an inert organic solvent, such as those named previously, at a temperature of about 0° to 50°C.

The compounds of formula I may also be produced by acylating a compound of the formula (VIII)
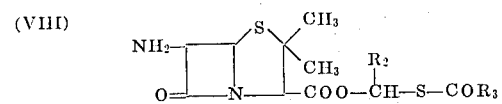

or a salt thereof with an activated derivative of the acid $R_1$—COOH. Such derivatives include, for example, acid halides, acid anhydrides, mixed anhydrides of the acid with, for example, carboxylic acid monoesters, trimethylacetic acid or benzoic acid, acid azides, active esters such as cyanomethyl ester or p-nitrophenyl ester or active amides such as acylimidazoles.

The acid $R_1$—COOH may also be reacted with a compound of formula VIII in the presence of a carbodiimide, for example, N,N'-dicyclohexylcarbodiimide, or an isoxazole salt such as N-ethyl-5-phenylisoxazolium-3'-sulfonate, or 2-ethoxy-1,2-dihydroquinoline-1-carboxylic acid ethyl ester.

The compounds of formula VIII are also new, and may be produced for example, by the reaction of a compound of the formula (IX)
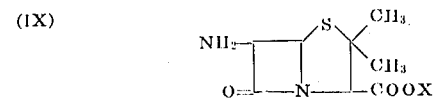

wherein X is the same as in formula II, especially triethylammonium, with a compound of formula III above. This reaction is effected at a temperature within the range of about 0° to 50°C., preferably about room temperature, in an inert solvent such as dimethylformamide.

The compounds of formula VIII may also be produced from compounds of formula I, especially when $R_1$ is a selected substituent such as benzyl or phenoxymethyl, by converting this particular compound of formula I with phosphorus pentachloride under anhydrous conditions to an imide chloride of the formula (X)
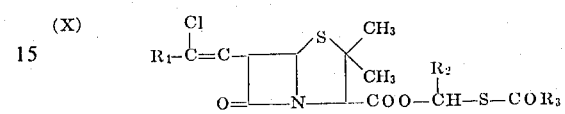

Then, by treating the product of formula X with certain alcohols, e.g., methanol or isopropanol, and further with water, the product of formula VIII, optimally in the form of its salt, such as the hydrochloride or tosylate, is obtained. By forming the salt the molecule is stabilized and more readily isolated.

Still another method of producing the products of this invention is by forming an activated derivative of a compound of the formula (XI)
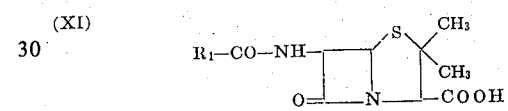

the activated derivative being of the conventional type referred to previously, e.g., formed by treatment with dicyclohexylcarbodiimide, and reacting this activated derivative with a compound of the formula (XII)

at a temperature in the range of about 0°C. to room temperature in a solvent inert to the reaction, e.g., tetrahydrofuran, dimethylformamide, dimethylacetamide, acetone, dioxane or the like.

Further process details are also provided in the illustrative examples.

Certain of the compounds of this invention may exist in different optically active forms. The various stereoisomeric forms as well as the racemic mixtures are within the scope of this invention.

The compounds of this invention have antibacterial activity against both gram positive and gram negative organisms such as *Staphylococcus aureus*, *Salmonella schottmuelleri*, *Pseudomonas aeruginosa*, *Proteus vulgaris*, *Escherichia coli* and *Streptococcus pyogenes*. They may be used as antibacterial agents in a prophylactic manner, e.g., in cleaning or disinfecting compositions, or otherwise to combat infections due to organisms such as those named above. They also show activity against fungi like *Candida albicans*. For example, a compound of formula I or a physiologically acceptable salt thereof may be used in various animal species in an amount of about 3 to 100 mg./kg., daily, orally or parenterally, preferably orally, in single or two to four divided doses to treat infections of bacterial origin, e.g., 4.0 mg./kg. in mice.

Up to about 500 mg. of a compound of formula I or a physiologically acceptable salt thereof may be incorporated in an oral dosage form such as tablets, capsules or elixirs or in an injectable form in a sterile aqueous vehicle prepared according to conventional pharmaceutical practice.

They may also be used in cleaning or disinfecting compositions, e.g., for cleaning barns or dairy equipment, at a concentration of about 0.01 to 0.5% by weight of such compounds admixed with, suspended or dissolved in conventional inert dry or aqueous carriers for application by washing or spraying. They are also useful as nutritional supplements in animal feeds.

The following examples are illustrative of the invention. All temperatures are on the centigrade scale. Additional variations may be produced in the same manner by appropriate substitution in the starting material.

EXAMPLE 1

3,3-Dimethyl-7-oxo-6-(2-phenylacetamido)-4-thia-1-azabicyclo-[3.2.0]heptane-2-carboxylic acid, (acetylthio)methyl ester 76.0 g. (0.2 mol.) of potassium benzylpenicillin are dissolved in 200 ml. of anhydrous dimethylformamide. 33.8 g. (0.2 mol.) of (bromomethyl)acetyl sulfide are added and the mixture is stirred for 24 hours at room temperature.

The turbid solution is poured into 2 liters of water and the mixture is layered over with ether. The layers are separated, the aqueous phase is extracted twice with ether, the combined ether extracts are washed three times with water, dried with magnesium sulfate and the solvent is evaporated at room temperature in a rotary evaporator. The residual crystals are triturated with a little isopropanol and filtered under suction. The product then is recrystallized from isopropanol. The yield is 26.5 g. of 3,3-dimethyl-7-oxo-6-(2-phenylacetamido)-4-thia-1-azabicyclo[3.2.0]heptane-2-carboxylic acid, (acetylthio)methyl ester, m.p. 124°–126°.

EXAMPLE 2

3,3-Dimethyl-7-oxo-6-(2-phenylacetamido)-4-thia-1-azabicyclo-[3.2.0]heptane-2-carboxylic acid, (benzolythio)methyl ester 24.7 g. (0.065 mol.) of potassium penicillin G are suspended in 130 ml. of absolute dimethylformamide and 15.0 g. (0.065 mol.) of (bromomethyl)benzyl sulfide are added. The mixture is stirred for 24 hours at room temperature. The reaction mixture is then poured into 500 ml. of ice water, the oily substance which separates is taken up in methylene chloride and the methylene chloride solution is shaken three times with water. This is dried with magnesium sulfate and the solvent is evaporated at room temperature in a rotary evaporator. 30 g. of a syrupy residue is obtained whose IR and NMR spectra corresponds to the structure 3,3-dimethyl-7-oxo-6-(2-phenylacetamido)-4-thia-1-azbicyclo[3.2.0]heptane-2-carboxylic acid, (benzoylthio)methyl ester.

EXAMPLE 3

6-(D-2-amino-2-phenylacetamido)-3,3-dimethyl-7-oxo-4-thia-1-azabicyclo[3.2.0]heptane-2-carboxylic acid, (acetylthio)methyl ester, hydrochloride (a) 14.7 g. of phosphorus pentachloride and 15.8 g. of quinoline are vigorously stirred in 140 ml. of anhydrous alcohol-free chloroform and cooled to −10°. To this is then added portionwise 25.7 g. of the product of Example 1 and the mixture is stirred for an additional 15 minutes at −10° whereupon an almost clear solution is obtained. Then 46 ml. of n-propanol are added over a period of five minutes and this is stirred at −10° for an additional 10 minutes. Now a solution of 22 g. of sodium chloride in 96 ml. of water is added while stirring vigorously, whereupon the temperature rises to 0°. The layers are separated and the chloroform layer is treated with one liter of petroleum ether with stirring. The supernatant is decanted from the precipitate, then stirred immediately with 200 ml. of ethyl acetate and 100 ml. of water and adjusted to pH 7 with sodium carbonate solution. The layers are separated and the ethyl acetate phase is dried with magnesium sulfate and filtered. To this solution containing the (acetylthio)methyl ester of 6-amino-penicillanic acid is added 100 ml. of a 0.5 molar solution of p-toluenesulfonic acid monohydrate in ethyl acetate. The tosylate of the (acetylthio)methyl ester of 6-aminopenicillanic acid precipitates. After standing for a while, the crystals are filtered under suction, washed with ethyl acetate and dried in a desiccator. The yield amounts to 15 g. A sample is crystallized from a little methanol and ethyl acetate added, m.p. 123°–127° (dec.)

The same product is obtained by stirring 10.9 g. of 6-aminopenicillanic acid (0.05 mol.) and 11.8 g. of (bromomethyl)acetylsulfide (0.07 mol.) together with 8.4 ml. of triethylamine and 0.5 g. of sodium iodide in 100 ml. of anhydrous dimethylformamide for 24 hours at 0°–5°, then pouring the mixture into ice water, taking this up in ethyl acetate, washing the ethyl acetate solution with water and drying to obtain the (acetylthio)methyl ester of 6-aminopenicillanic acid. This is then treated with a solution of p-toluene-sulfonic acid in ethyl acetate.

(b) 8 g. of the tosylate obtained in part a are suspended in 250 ml. of ethyl acetate, the suspension is cooled to 0°, treated with 300 ml. of a 2% aqueous solution of sodium bicarbonate solution and vigorously stirred at 0° for several minutes. The organic phase is washed again with dilute sodium bicarbonate solution and water, dried with magnesium sulfate and concentrated to a volume of 40 ml. (solution A).

4.55 g. of the methyl acetoacetic ester enamine of D-phenylglycine are suspended in 65 ml. of ethyl acetate. 0.085 ml. of N-methylmorpholine are added and, after cooling to −15°, 2.35 ml. of isobutyl chloroformate are added. This is stirred for 10 minutes at that temperature. Then solution A is quickly added dropwise. The reaction mixture is stirred an additional 10 minutes at −15° and then the temperature is permitted to rise to +10° over a period of 40 minutes. The solution is washed with 20 ml. of water, then with 20 ml. of sodium carbonate solution and finally twice more with 10 ml. portions of water. The solution is dried with magnesium carbonate and the solvent is separated in a rotary evaporator at room temperature. The residue is dissolved in 35 ml. of water. The mixture is vigorously stirred and at a temperature in the range of 10°–15° 4N hydrochloric acid is slowly added with pH control until a pH 2.5 is attained. The tetrahydrofuran is distilled from the mixture in vacuo whereupon a large amount of oil separates. This is extracted 4 times with 5 ml. portions of ethyl acetate, the layers are separated and the ethyl acetate phase, after the addition of 10 ml. of water, is again adjusted to pH 2.5. The layers are separated, the aqueous phase is combined with the above obtained aqueous phase and saturated with sodium chloride. An oily layer forms, which is separated. The aqueous phase is extracted with 10 ml. of ethyl acetate which is combined with the oily layer. This is dried with magnesium sulfate, concentrated to a small volume and, upon the addition of ether, 6-(D-2-amino-2-phenylacetamido)-3,3-dimethyl-7-oxo-4-thia-1-azabicyclo-[3.2.0]heptane-2-carboxylic acid, (acetylthio)methyl ester, hydrochloride, precipitates, yield 1.6 g., m.p. 161° (dec.).

EXAMPLE 4

3,3-Dimethyl-7-oxo-6-[(2-phenoxymethyl)acetamido]-4-thia-1-azabicyclo[3.2.0]heptane-2-carboxylic acid, (acetylthio)methyl ester By substituting an equivalent amount of potassium phenoxymethylpenicillin for the potassium benzylpenicillin in the procedure of Example 1, 3,3-dimethyl-7-oxo-6-[(2-phenoxymethyl)acetamido]-4-thia-1-azabicyclo[3.2.0]heptane-2-carboxylic acid, (acetylthio)methyl ester is obtained as a colorless syrup.

EXAMPLE 5

3,3-Dimethyl-7-oxo-6-(2-phenylacetamido)-4-thia-1-azabicyclo-[3.2.0]heptane-2-carboxylic acid, (pivaloylthio)methyl ester By substituting (bromomethyl)pivaloyl sulfide for the (bromomethyl)acetyl sulfide in the procedure of Example 1, 3,3-dimethyl-7-oxo-6(2-phenylacetamido)-4-thia-1azabicyclo-[3.2.0]heptane-2-carboxylic acid, (pivaloylthio)methyl ester is obtained.

The following additional products are obtained by the procedure of the example indicated in the table by substituting for the starting material in the example the substances have the indicated substituents:

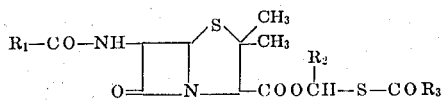

| Example | R₁ | R₂ | R₃ | Method of example |
|---|---|---|---|---|
| 6 | HO—⟨⟩—CH(NH₂)— | CH₃ | —CH₂CH₃ | 3(b) |
| 7 | HO—⟨Cl,Cl⟩—CH(NH₂)— | '' | —⟨⟩ | 3(b) |
| 8 | ⟨Cl⟩—CH(NH₂)— | —⟨⟩ | —CH₃ | 3(b) |
| 9 | CH₃O—⟨⟩—CH(NH₂)— | —CH₂CH₃ | —CH₃ | 3(b) |
| 10 | NH₂—⟨⟩—CH₂— | —CH₂—⟨⟩ | —CH₃ | 3(b) |
| 11 | ⟨⟩—CH(NH₂)— | '' | —CH₂—⟨⟩ | 3(b) |
| 12 | ⟨⟩—CH(NH—CO—NH₂)— | '' | —C(CH₃)₃ | 3(b) |
| 13 | ⟨⟩—CH(NH—CO—NH₂—COCH₃)— | —CH₃ | —⟨⟩ | 3(b) |
| 14 | ⟨⟩—CH(NH—CO—NH—SO₂—⟨⟩)— | '' | —CH₃ | 3(b) |
| 15 | ⟨⟩—CH(OH)— | '' | —C(CH₃)₃ | 3(b) |
| 16 | ⟨⟩—CH(COOH)— | —⟨⟩ | —CH₃ | 3(b) |
| 17 | ⟨⟩—CH(SO₃H)— | '' | —CH₂CH₃ | 3(b) |

−Continued

| Example | R₁ | R₂ | R₃ | Method of example |
|---|---|---|---|---|
| 18 | thiophene-CH₂— | H | —CH₃ | 1 |
| 19 | furan-CH₂— | —CH₂CH₂—C₆H₅ | —CH₃ | 1 |
| 20 | thiophene-CH(NH₂)— | H | —C(CH₃)₃ | 3(b) |
| 21 | thiophene-CH(NH₂)— | —CH₃ | —CH(CH₃)₂ | 3(b) |
| 22 | C₂H₅ | H | —CH₃ | 1 |
| 23 | C₃H₇ | CH₃ | CH₂=CH— | 1 |
| 24 | thiolane-CH₂— | H | C₆H₅ | 1 |
| 25 | thiane-CH₂— | H | CH₃ | 1 |
| 26 | cyclohexenyl-CH₂— | H | CH₃ | 1 |
| 27 | C₆H₅-CH(NH₂)— | H | CH₃ | 1 |
| 28 | (3-methylisoxazol-5-yl)-CH₂— | H | CH₃ | 1 |

What is claimed is:

1. A compound of the formula

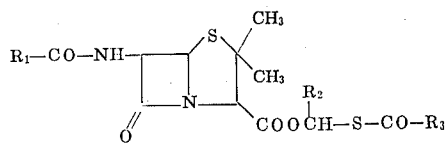

wherein R₁ is phenoxymethyl, phenyl-lower alkyl, and phenyl-lower alkyl bearing on the α-carbon hydroxy, amino, carboxy or ureido, R₂ is hydrogen, lower alkyl, phenyl or phenyl-lower alkyl, and R₃ is lower alkyl, lower alkenyl, phenyl or phenyl-lower alkyl, and acid addition salts of the basic members thereof.

2. A compound as in claim 1 wherein R₁ is benzyl or benzyl bearing on the α-carbon amino, hydroxy, carboxy or ureido.

3. A compound as in claim 1 wherein R₁ is phenoxymethyl.

4. A compound as in claim 2 wherein R₂ is hydrogen and R₃ is lower alkyl.

5. A compound as in claim 1 wherein R₁ is benzyl, R₂ is hydrogen and R₃ is methyl.

6. A compound as in claim 1 wherein R₁ is benzyl, R₂ is hydrogen and R₃ is phenyl.

7. A compound as in claim 1 wherein R₁ is α-aminobenzyl, R₂ is hydrogen and R₃ is methyl.

8. A compound as in claim 1 wherein R₁ is phenoxymethyl, R₂ is hydrogen and R₃ is methyl.

9. A compound as in claim 1 wherein R₁ is benzyl, R₂ is hydrogen and R₃ is t-butyl.

* * * * *